(No Model.)

H. ARENBERG.
VEHICLE.

No. 404,461. Patented June 4, 1889.

Witnesses,
Geo. H. Strong,
J. H. Rouse

Inventor
H. Arenberg,
By Dewey & Co,
attys

UNITED STATES PATENT OFFICE.

HERMAN ARENBERG, OF EDGWOOD, CALIFORNIA, ASSIGNOR OF ONE-HALF TO GEORGE J. CLARK, OF SAME PLACE.

VEHICLE.

SPECIFICATION forming part of Letters Patent No. 404,461, dated June 4, 1889.

Application filed January 19, 1889. Serial No. 296,936. (No model.)

*To all whom it may concern:*

Be it known that I, HERMAN ARENBERG, of Edgwood, Siskiyou county, State of California, have invented an Improvement in Vehicles; and I hereby declare the following to be a full, clear, and exact description of the same.

My invention relates to the class of vehicles; and my invention consists in the hereinafter-described novel means of mounting the body of the vehicle upon its running-gear.

My invention, though applicable to all kinds of vehicles, is especially applicable to those two-wheeled vehicles commonly known as "carts," for its object is to overcome and ease up the several unpleasant motions of vehicles by allowing the body an independence sufficient to counteract the tendency to undue motion, which tendency is obviously greater in two-wheeled vehicles than in other forms.

Figure 1:
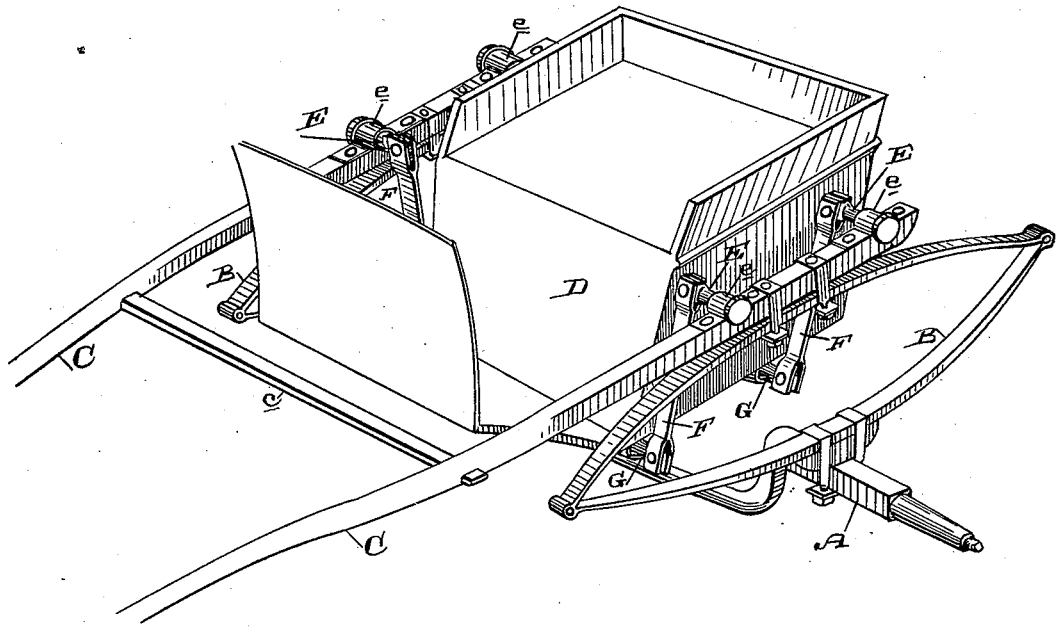
Figure 2:
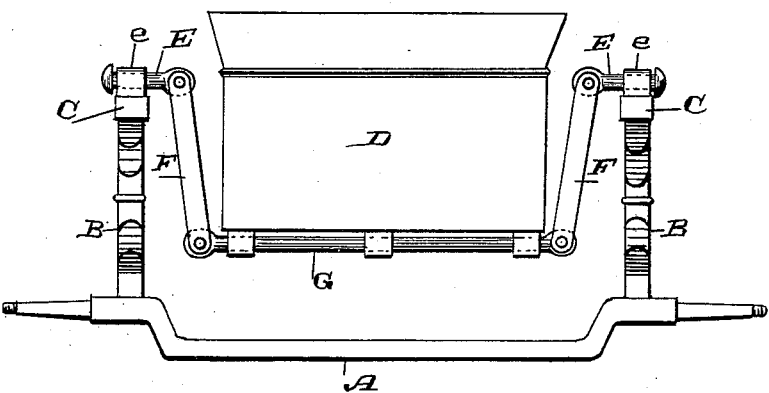

Referring to the accompanying drawings for a more complete explanation of my invention, Figure 1 is a perspective view of my vehicle. Fig. 2 is a rear elevation of same.

I have herein illustrated my invention, for the sake of clearness, as applied to a two-wheeled vehicle, in which A is the axle, supposed to have wheels, which, however, are not here shown. B are the springs, clipped solidly to the axle in the usual manner, and C are the shafts, clipped to the top of the springs and having the cross-bar c.

D is the body of the vehicle. This body is hung from the shafts in the following manner: In bearings e on top of the shafts are pivoted the short rock-bolts E, the outer ends of which are headed, and the inner ends preferably flattened to receive the forked upper ends of the hangers or links F. These hangers or links may be made of one or two pieces, their upper ends being pivoted to the rock-bolts, whereby they may have a movement from side to side on their pivotal centers.

In suitable bearings under the body D are mounted the rock-bars G, the ends of which receive the forked lower ends of the hangers F, which are pivoted thereto. It will be seen that by thus hanging the body it has great independence of motion, which will enable the rider to counteract or correct the unpleasant movement which is ordinarily derived from the jogging of the horse, and in all kinds of vehicles will make the body easy and pleasant to ride in.

The body has a movement from side to side upon its pivoted hangers F, while it has a movement forward and back by means of the rock-bolts E on top of the shafts and the rock-bars G underneath the body, while between the side and forward and back movements it has intermediate or modified movements in diagonal lines permitted by the rocking of the bolts and bars.

Having thus described my invention, what I claim as new, and desire to secure by Letters Patent, is—

1. In a vehicle, and in combination with its running-gear and the body, the means for suspending the body from the running-gear, consisting of pivoted or rock bars on the body, pivoted or rock bolts on the running-gear, and intervening links or hangers pivoted to both bolts and bars, substantially as described.

2. In a vehicle, and in combination with its axle, springs, shafts, and body, the means for connecting the body, consisting of the pivot or rock bolts E on top of the shafts, the pivot or rock bars G under the body, and the intervening hangers or links F, pivoted at their upper ends to the rock-bolts and at their lower ends to the rock-bars, substantially as described.

In witness whereof I have hereunto set my hand.

HERMAN ARENBERG.

Witnesses:
G. H. CONNER,
FRANK J. CAVANAUGH.